Oct. 23, 1951     R. H. HUNTER ET AL     2,572,485
VALVE REPAIRING MACHINE
Filed March 4, 1949     3 Sheets-Sheet 3
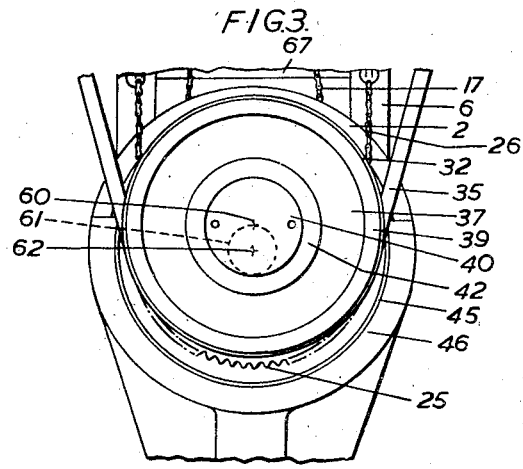
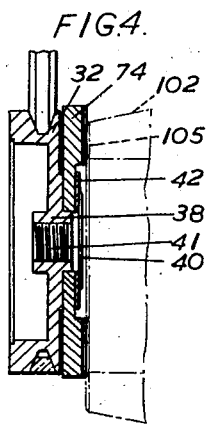
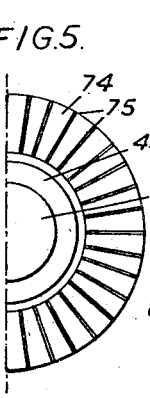
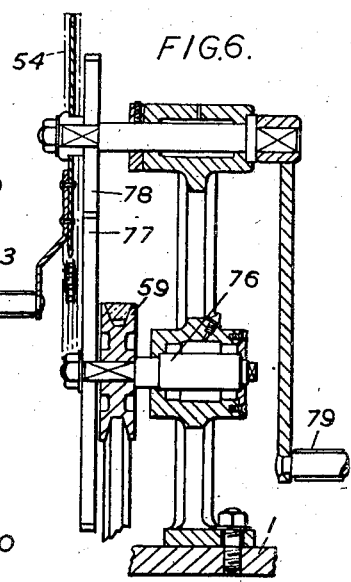
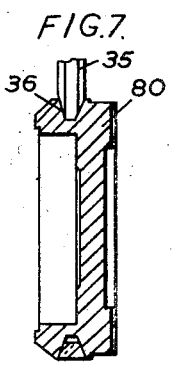
Inventors
Richard Harold Hunter
Cyril George Seeds
By
Pennie, Edmonds, Morton and Barrows
Attorney Patented Oct. 23, 1951

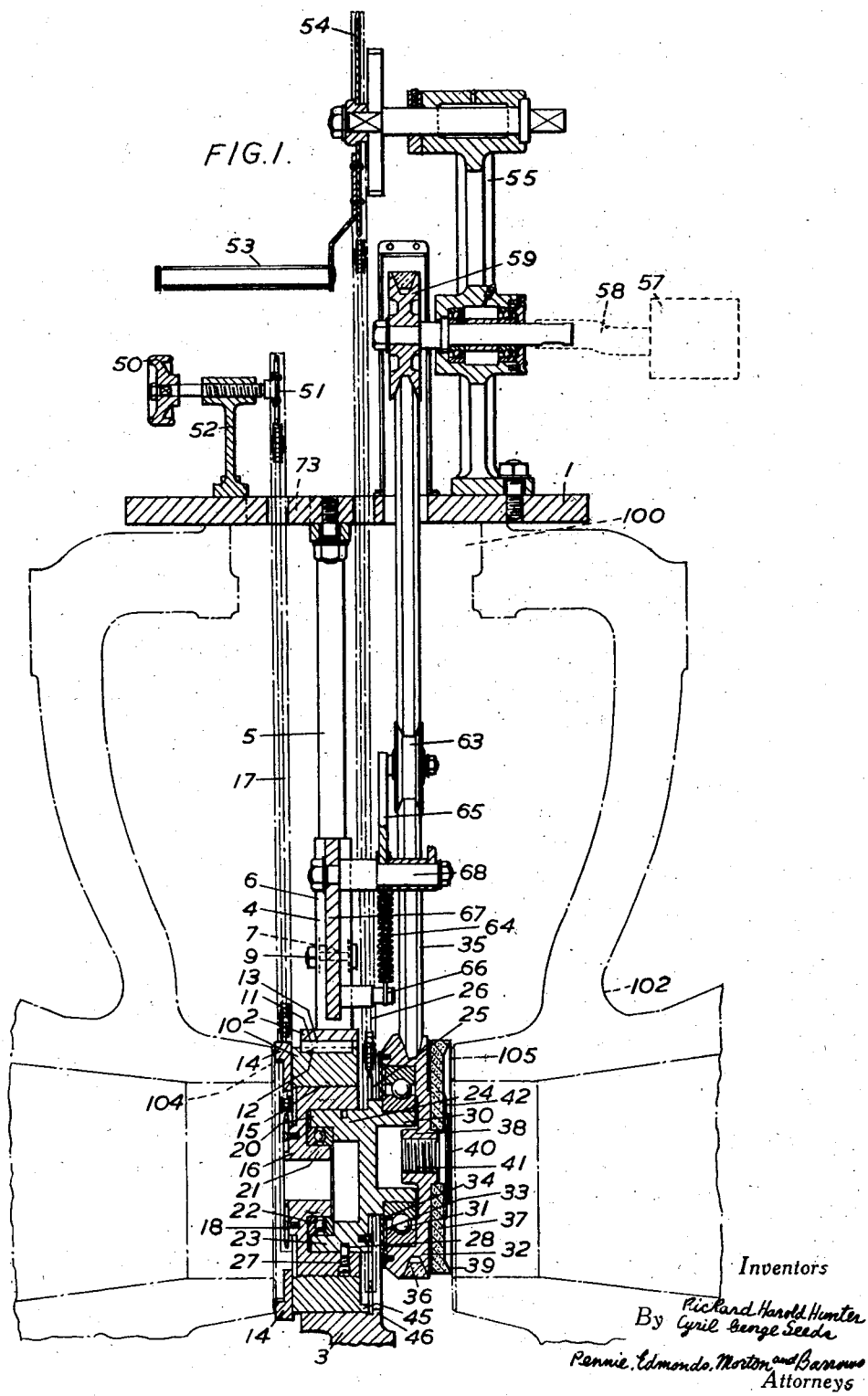

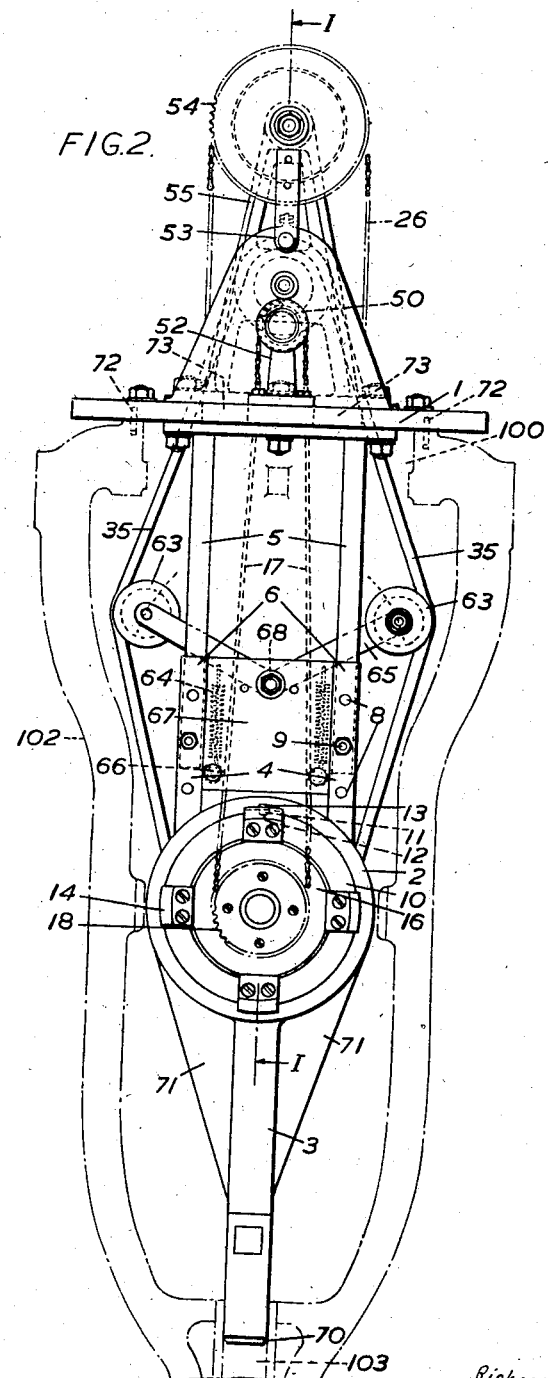

2,572,485

UNITED STATES PATENT OFFICE 2,572,485

VALVE REPAIRING MACHINE

Richard Harold Hunter, Coulsdon, and Cyril George Seeds, London, England, assignors to Dewrance & Company Limited, London, England, a British company Application March 4, 1949, Serial No. 79,548
In Great Britain March 12, 1948

7 Claims. (Cl. 51—241)

1

This invention relates to machines suitable for repairing the valve seat faces of parallel slide valves, an object being to enable damaged valve seat faces of such valves to be lapped or ground and lapped while the valves are in position. This is of particular importance when the valve is welded to a pipe line. Another object is the provision of an advantageous method of repairing valve seat faces of parallel slide valves of the kind having a body with an opening opposite an aperture for the passage of the valve spindle.

Features of novelty characterising our invention are pointed out in the claims annexed to and forming part of the present specification. The above and further objects and advantages of the invention will be apparent from the accompanying drawings and from the subsequent description relative thereto in which we have illustrated and described preferred embodiments of our invention.

The invention will now be described, by way of example, with reference to the accompanying drawings, in which:

Figure 1 is a view, omitting part of a stationary rod-like member 3, in section on the line I—I of Figure 2, of a machine set up for grinding a valve seat face of a parallel slide valve having a body with an opening opposite an aperture for the passage of the valve spindle, Figure 2 is an outside view of the machine shown in Figure 1, looking from the left-hand side thereof, and to a smaller scale so as to include the stationary rod-like member, Figure 3 is an outside view of part of the machine shown in Figure 1, showing the grindstone and tool holder as seen from the right-hand side thereof, Figure 4 is a view in a section similar to that of Figure 1 of part of the machine showing how when the machine is set up for lapping the valve seat face the tool holder carries a lapping plate, Figure 5 is an outside view of half of the lapping plate from the right-hand side of Figure 4, Figure 6 is a view in section similar to that of Figure 1 of the part of the machine on the other side of the base plate from the tool holder showing modified operating means used when the machine is set up for lapping, and Figure 7 is a view in a section similar to that of Figure 1 showing a tool holder and lapping plate formed in one piece.

Referring to Figures 1, 2, and 3 of the drawings, the machine includes a base plate 1 on one side of which is mounted a frame having a telescopic part 4. The telescopic part is in the form of two parallel spaced inner telescopic legs 5 suitably mounted perpendicularly to the base plate, and two complementary outer telescopic legs 6 welded to a part of the frame in the form of an annulus 2. Each inner telescopic leg 5 is formed with a hole the bore 7 of which can register with any one of three longitudinally spaced holes 8 passing through the associated outer telescopic leg 6, and as shown registers with the middle hole 8. Bolts 9 passing through registering holes 8 and bores 7 position the annulus 2 relatively to the base plate 1. Projecting from the side of the annulus opposite to the base plate is a rod-like member 3.

Within the annulus 2 is arranged an abutment member 10 of cylindrical form rotation of which within the annulus is prevented through the provision of a key 11 arranged in a recess 12 in the abutment member and engaging within a key way 13 in the annulus permitting axial movement of the key and abutment member within the annulus. The abutment member is provided on one side with four equidistantly spaced detachable abutment feet 14 suitably of bronze, for engaging the valve seat face opposite that which is to be ground.

The abutment member is formed internally with a screw thread for co-operating with a complementary thread on an inner member 16, which is rotatable relatively to the abutment member by means of a chain 17 passing round a sprocket wheel 18 secured to the inner member co-axially with the screw thread thereon.

The inner member 16 is formed with an annular axially extending recess 20 around an inner axial projection 21, and within the recess and adjacent the inner projection is a thrust ball-bearing 22 arranged between the inner member and an axially extending projection 23 of a rotatable member 24 journalled within the recess 20 of the inner member and arranged to rotate on the same axis as that member. The rotatable member carries a sprocket wheel 25 co-axial with the axis of rotation, around which passes a driving chain 26. The rotatable member 24 is retained in axial position relatively to the inner member 16 by means of a locating screw 27 projecting radially inwardly into an annular recess 28 formed in the outer surface of the projection 23.

On the other side of the sprocket wheel 25 from the projection 23, the rotatable member is formed with an annular projection 30 whose axis is eccentric to the axis of rotation to the rotatable member. Around the eccentric projection is a ball bearing 31 of the type adapted to withstand axial and radial thrusts, which with the eccentric projection is accommodated within a recess in a tool holder 32, intended to execute a gyratory movement required by the tool during the repairing operation. Grease for the ball-bearing is retained by a felt washer 33 backed by a retaining plate 34.

The tool holder is in the form of a pulley wheel which is rotatable by a V-belt 35 passing around the tool holder in a V-shaped groove 36 therein. The tool holder, on its side remote from the eccentric projection 30 on which it rotates, carries a grindstone 37 having a central aperture fitting around a central boss 38 in the tool holder, and formed with an annular peripheral sidewardly extending part 39, providing an operative surface for grinding the valve seat face. The grindstone is held on the tool holder by the head 40 of a screw 41 which screws into the boss 38 and applies pressure to the grindstone through a retaining plate 42.

The assembly consisting of the grindstone, tool holder, rotatable member, inner member and abutment member is unable to move axially of the annulus too far in one direction by reason of the contact which would ensue between the chain 26 of the sprocket wheel 25 and the annulus. In the other direction, axial movement of the assembly is limited by engagement between a part 45 projecting axially from around a portion of the periphery of the abutment member and a complementary shoulder 46 projecting inwardly from the annulus on the same side of the abutment member as the tool holder.

On the other side of the base plate from the frame are mounted different means for respectively rotating the inner member 16, rotatable member and the tool holder, comprising a hand feed wheel 50 for turning a hand feed sprocket wheel 51 mounted on an auxiliary bracket 52 and around which passes the chain 17 for turning the sprocket wheel 18 on the inner member; a handle 53 for turning a sprocket wheel 54 mounted on a main bracket 55 and around which passes the chain 26 for turning the rotatable member; and a fractional horsepower electric motor indicated diagrammatically at 57 for driving through a flexible drive 58 a V-pulley 59 also mounted on the main bracket 55 and around which passes the V-belt 35 for turning the tool holder. The base plate is suitably slotted for the passage of the two chains and the V-belt. A belt guard encloses the V-pulley and the adjacent part of the V-belt.

The effect of turning the hand wheel 50 is to turn the sprocket wheel 18 and the inner member 16 secured thereto, which by reason of the screw thread engagement between the inner member and the abutment member 10, which cannot rotate, is constrained to move axially relatively to the abutment member as well as rotating. The result of this axial movement is to increase or to decrease the distance between the grindstone and the abutment feet.

It will be understood that by reason of the eccentricity of the projection 30 on the rotatable member 24 the distance of the tool holder from the V-pulley 59 varies during a rotation of the rotatable member, the axis 60 (see Figure 3) of the tool holder traversing the circle 61 around the axis 62 of the rotatable member. In order to maintain the V-belt tension during such motion, two jockey pulleys 63 are provided which bias the two V-belt strands outwardly and away from one another, and each of which is biassed to bear on the belt by a tension spring 64 one end of which engages a supporting arm 65 for the jockey pulley and the other end of which engages a stud 66 on a plate 67 extending between the outer telescopic legs and carrying a common pivot 68 for the jockey pulley arms.

The member 3 is in the form of a round bar having a bevelled end 70. Reinforcing webs 71 are provided between the said member and the annulus.

The base plate 1 is adapted to be placed over an opening in the part of a parallel slide valve body opposite the aperture therein for the passage of the valve spindle. Suitably disposed guide pins 72 are provided for locating the base plate relatively to the valve body, and studs (for receiving which the valve body is provided with suitable tapped sockets) are used for securing the base plate to the valve body. The rod-like member 3 on the other side of the annulus from the base plate is adapted to engage in the aperture provided for the passage of the valve spindle.

For operating the machine to grind a valve seat face of a parallel slide valve for which it may be adapted, the machine is arranged with lengths of abutment feet 14, of chains 17 and 26, and of V-belt 35 to suit the size of valve, and the relative positions of the inner and outer telescopic legs are suitably adjusted. The hand feed wheel is rotated if desired to reduce the distance between the grindstone and the abutment feet. The cover is removed from the opening in the part of the valve body opposite the aperture for the passage of the valve spindle and the movable parts of the valve including the valve spindle are removed.

The frame is then inserted through the opening 100 (referring to Figures 1 and 2 in which the valve body is shown in dotted lines) in the valve body 102 so that the rod-like member 3 enters the aperture 103 for passage of the valve spindle, and the abutment feet are adjacent the valve seat face 104 opposite the valve seat face 105 which is to be ground and the base plate is secured in position on the valve body. Observation to assist positioning is possible through suitable observation apertures 73 in the base plate.

When the electric motor is started, the grindstone is rotated at a high speed and rotation of the hand feed wheel 50 effects relative movement between the abutment member 10 and the tool holder 32 so that the grindstone 37 is brought into contact with the valve seat face 105 to be ground. Rotation of the rotatable member 24 by manual operation of the handle 53 produces a planetary movement of the grindstone in relation to the valve seat face 105, with the result that the grindstone effectively operates upon the whole of the face. The hand feed wheel is operated until the valve seat face has been ground to the requisite extent.

During the grinding operation, the axial thrust between the valve seat face 105 and the grindstone is transmitted through the abutment feet to the opposing valve seat face 104. Moreover, the annulus 2 within which the abutment member is slidable is firmly positioned by the base plate 1 and the telescopic legs 5 and 6 and the rod-like member 3 also assists in supporting the annulus. The tool holder is, therefore, properly located throughout the grinding operation.

At the completion of the grinding operation the hand feed wheel 50 is rotated to retract the grindstone from the valve seat face, the base plate is released from the valve body and the frame is withdrawn from the interior of the valve body.

The same machine may be arranged for lapping and in order to lap the valve seat face, the grindstone 37 is removed from the tool holder 32 and replaced by a cast iron lapping plate 74 (see Figures 4 and 5) also fitting around the tool holder central boss 38 and then secured to the tool holder by means of the screw 41. The lapping plate 74 is formed with the usual paste retaining grooves 75. The flexible drive 58 is disconnected from the spindle of the pulley 59 (see Figure 6), the belt guard is removed, the spindle of the pulley 59 is replaced by a spindle 76 upon whose end as well as the pulley 59 a spur wheel 77 may be mounted, and the spur wheel 77 is arranged to engage with a second spur wheel 78 mounted upon the spindle of the sprocket wheel 54 carrying the chain 26. Over an end of the spindle of the sprocket wheel 54 is placed the hub of an operating handle 79 of long crank.

The machine is then installed in position as before in relation to the valve seat face being repaired, the hand feed wheel 50 is operated to bring the lapping plate into engagement with the valve seat face to be lapped, and the handle 79 is turned and by driving the tool holder 32 through the belt 35 and the rotatable member 24 through the chain 26 produces both a rotary and a planetary movement of the lapping plate in relation to the surface of the valve seat face.

The machine enables valve seat faces rapidly and accurately to be ground and lapped while a valve is in position in a pipe line. Naturally the machine may be used in connection with a valve before it is installed in a pipe line or after removal of the valve from the pipe line. Moreover, two machines may be provided, one for grinding valve seat faces and the other for lapping the faces.

The machine above described, when intended only for lapping may utilise a rotatably mounted gyratory tool formed with a lapping surface, i. e. the tool holder and lapping plate may be formed in one piece as shown at 80 in Figure 7.

We claim:

1. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, locating means for locating the abutment member within the valve body relative to the valve seat face to be repaired, means for varying the relative positioning of the abutment member and gyratory means in the direction of the axis of rotation of the gyratory means, driving means for rotating the gyratory means, and driving means for rotating the rotatable member.

2. A machine for repairing a valve seat face of a parallel slide valve, comprising a grindstone, gyratory means on which the grindstone is mounted and for applying a grinding action to the valve seat face, a rotatable member, a first bearing through which the gyratory means is rotatably mounted on the rotatable member, an abutment member adapted to be seated in relation to the valve body internally thereof, a second bearing which has an axis of rotation parallel with and eccentric to that of the first bearing and through which the rotatable member is rotatably mounted on the abutment member, locating means for locating the abutment member within the valve body relative to the valve seat face to be repaired, means for varying the relative positioning of the abutment member and gyratory means in the direction of the axis of rotation of the gyratory means, driving means for rotating the gyratory means, and driving means for rotating the rotatable member.

3. A machine for repairing a valve seat face of a parallel slide valve, comprising gyratory means for applying a tooling action to the valve seat face, a rotatable member, a first bearing through which the gyratory means is rotatably mounted on the rotatable member, an inner member on which the rotatable member is mounted and which is formed with a screw thread around an axis parallel to the axis of rotation of the gyratory means, a second bearing which has an axis of rotation parallel with and eccentric to that of the first bearing and through which the rotatable member is rotatably mounted on the inner member, an abutment member adapted to be seated in relation to the valve body internally thereof and formed internally with a screw thread for co-operating with the thread on the inner member, means for effecting relative rotation between the abutment member and the inner member, a frame for locating the abutment member within the valve body in relation to the valve seat face to be repaired and arranged to support said abutment member slidably for movement in the direction of the axis of rotation of the gyratory means, driving means for rotating the gyratory means, and driving means for rotating the rotatable member.

4. A machine for repairing a valve seat face of a parallel slide valve, comprising gyratory means for applying a tooling action to the valve seat face, a rotatable member, a first bearing through which the gyratory means is rotatably mounted on the rotatable member, an abutment member provided with feet arranged for engagement at peripherally spaced locations with a valve seat face of the parallel slide valve opposite that for repair, a second bearing which has an axis of rotation parallel with and eccentric to that of the first bearing and through which the rotatable member is rotatably mounted on the abutment member, locating means for locating the abutment member within the valve body relative to the valve seat face to be repaired, means for varying the relative positioning of the abutment member and gyratory means in the direction of the axis of rotation of the gyratory means, driving means for rotating the gyratory means, and driving means for rotating the rotatable member.

5. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to be seated in relation to the valve body internally thereof, a second bearing which has an axis of rotation parallel with and eccentric to that of the first bearing and through which the rotatable member is rotatably mounted on the abutment member, a frame for locating the abutment member within the valve body in relation to the valve seat face to be repaired, the frame including a telescopic part, a base plate transverse to the telescopic part and adapted to be secured to the valve body at an opening therein, and the distance between which plate and the axis of rotation of the rotatable member is adjustable by means of the telescopic part, position adjusting means for varying the relative positions of the abutment member and the gyratory means in the direction of the axis of rotation of the gyratory means and carried by the base plate, driving means for actuating the position adjusting means, driving means for rotating the gyratory means, driving means for rotating the rotatable member, and an extension to the frame on the side of the gyratory means diametrically opposite from the base plate adapted to engage an aperture provided for the passage of the valve spindle.

6. A machine for repairing a valve seat face of a parallel slide valve, comprising a grindstone, gyratory means on which the grindstone is mounted and for applying a grinding action to the valve seat face, a rotatable member, a first bearing through which the gyratory means is rotatably mounted on the rotatable member, an abutment member adapted to be seated in relation to the valve seat face opposite that to be repaired and formed with an external cylindrical bearing surface with axis parallel to the axis of the gyratory means, a second bearing which has an axis of rotation parallel with and eccentric to that of the first bearing and through which the rotatable member is rotatably mounted on the abutment member, a frame for locating the abutment member within the valve body relative to the valve seat face to be repaired and formed with an internal cylindrical bearing surface arranged to engage with the cylindrical bearing surface on the abutment member, means for varying the relative positioning of the abutment member and gyratory means in the direction of the axis of rotation of the gyratory means, driving means for rotating the gyratory means, and driving means for rotating the rotatable member.

7. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to be seated in relation to the valve body internally thereof, a second bearing which has an axis of rotation parallel with and eccentric to that of the first bearing and through which the rotatable member is rotatably mounted on the abutment member, a frame for locating the abutment member within the valve body in relation to the valve seat face to be repaired, the frame including a telescopic part, a base plate transverse to the telescopic part and adapted to be secured to the valve body at an opening therein, and the distance between which plate and the axis of rotation of the rotatable member is adjustable by means of the telescopic part, position adjusting means for varying the relative positions of the abutment member and the gyratory means in the direction of the axis of rotation of the gyratory means and carried by the base plate, driving means for actuating the position adjusting means, driving means for rotating the gyratory means, and driving means for rotating the rotatable member.

RICHARD HAROLD HUNTER.
CYRIL GEORGE SEEDS.

REFERENCES CITED

The following references are of record in the file of this patent:

UNITED STATES PATENTS

| Number | Name | Date |
|---|---|---|
| 637,249 | Hall | Nov. 21, 1899 |
| 801,350 | Williams | Oct. 10, 1905 |
| 1,227,515 | Williams et al. | May 22, 1917 |
| 1,745,015 | Johnson | Jan. 28, 1930 |
| 1,941,918 | Schwakopf | Jan. 2, 1934 |
| 2,230,953 | Indge | Feb. 4, 1941 |
| 2,303,531 | Eyster | Dec. 1, 1942 |
| 2,384,253 | Gearum | Sept. 4, 1945 |

FOREIGN PATENTS

| Number | Country | Date |
|---|---|---|
| 311,820 | Great Britain | Aug. 29, 1929 |